(12) United States Patent
Kalyana et al.

(10) Patent No.: US 10,164,828 B2
(45) Date of Patent: *Dec. 25, 2018

(54) GEOSPATIAL BASED MANAGEMENT OF CONFIGURATION PROFILES

(71) Applicant: International Business Machines Corporation, Armonk, NY (US)

(72) Inventors: Shankar S. Kalyana, Austin, TX (US); Jigneshkumar K. Karia, Maharashtra (IN); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/374,106

(22) Filed: Dec. 9, 2016

(65) Prior Publication Data

US 2017/0093632 A1 Mar. 30, 2017

Related U.S. Application Data

(63) Continuation of application No. 14/078,605, filed on Nov. 13, 2013, now Pat. No. 9,553,765.

(51) Int. Cl.
*G06F 15/177* (2006.01)
*H04L 12/24* (2006.01)

(52) U.S. Cl.
CPC ...... *H04L 41/0816* (2013.01); *H04L 41/0843* (2013.01); *H04L 41/0886* (2013.01); *H04L 41/0893* (2013.01); *H04L 41/12* (2013.01)

(58) Field of Classification Search
CPC .............. H04L 41/0681; G06F 2221/2111
USPC ........................................ 709/220, 221, 222
See application file for complete search history.

(56) References Cited

U.S. PATENT DOCUMENTS

| 7,213,057 | B2 | 5/2007 | Trethewey et al. | |
|---|---|---|---|---|
| 7,363,357 | B2 * | 4/2008 | Parupudi | G06F 17/3087 701/532 |
| 7,523,212 | B2 * | 4/2009 | Woolf | G06F 9/44505 709/219 |

(Continued)

OTHER PUBLICATIONS

Geowhere, "Geo-fence technology and applications", sensewhere. com, 2013, 2 pages.
Luggage Tracking, Live Tracking for Luggage and Suitcases, http://www.ninjatracking.co.uk/trackers/luggage-tracking, Sep. 9, 2013, 2 pages.
Beyer, "Geospatial Modelling Environment", www.spatialecology. com/gme, Version 0.7.2 RC2, 2009-2012 Spatial Ecology LLC, 158 pages.

(Continued)

*Primary Examiner* — Edward Kim
(74) *Attorney, Agent, or Firm* — Robert J. Shatto; Hoffman Warnick LLC

(57) ABSTRACT

A system, method and program product for managing profiles for devices in a network. A computer system is disclosed having a configuration management system for managing configuration profiles for a set of devices within a network, and includes: a boundary definition system that employs a computerized process for defining a plurality of geospatial boundaries; a device manager that employs a computerized process for interfacing with remote agents associated with respective devices to recognize when a device has migrated into a new geospatial boundary; and a profile management system that employs a computerized process for uploading an updated configuration profile to the remote agent in response to the device being migrated to the new geospatial boundary.

20 Claims, 3 Drawing Sheets

(56) References Cited

U.S. PATENT DOCUMENTS

| | | | | |
|---|---|---|---|---|
| 7,668,931 | B2* | 2/2010 | Parupudi | G06F 17/3087 |
| | | | | 455/414.2 |
| 8,018,329 | B2 | 9/2011 | Morgan et al. | |
| 8,250,184 | B2* | 8/2012 | Poyhonen | H04L 29/12283 |
| | | | | 709/220 |
| 8,478,306 | B2 | 7/2013 | Zheng | |
| 8,769,063 | B2* | 7/2014 | Barton | H04L 41/00 |
| | | | | 709/220 |
| 8,909,771 | B2* | 12/2014 | Heath | G06Q 30/02 |
| | | | | 705/39 |
| 2002/0124067 | A1* | 9/2002 | Parupudi | G06F 21/62 |
| | | | | 709/223 |
| 2005/0055430 | A1* | 3/2005 | Parupudi | G06F 17/3087 |
| | | | | 709/222 |
| 2005/0193100 | A1* | 9/2005 | Woolf | G06F 9/44505 |
| | | | | 709/220 |
| 2011/0063138 | A1 | 3/2011 | Berkobin et al. | |
| 2012/0254382 | A1 | 10/2012 | Watson et al. | |
| 2014/0032758 | A1* | 1/2014 | Barton | H04L 41/00 |
| | | | | 709/225 |
| 2015/0134788 | A1 | 5/2015 | Kalyana et al. | |

OTHER PUBLICATIONS

Michelet, "Tivoli Configuration Manager", Tivoli Documentation Central, Oct. 24, 2012, 2 pages.

Blake et al., "Perceptual Mapping by Multidimensional Scaling: A Step by Step Primer", Methodology Series, Sep. 2003, Cleveland State Universtiy, Research Reports in Consumner Behavior, 70 pages.

Inselberg et al., Parallel Coordinates: A Tool for Visualizing Multi-Dimensional Geometry, 1990 IEEE, 18 pages.

"Specifying a coordinate system", ArcGis Help 10.1, ESRI, http://resources.arcgis.com/en/help/main/10.1/index.html#//0066000000, Sep. 9, 2013, 1 page.

"Introduction to the ArcGIS raster tutorial", ArcGIS Help 10.1, http://resources.arcgis.com/en/help/main/10.1/index.html#//00660000000v000000, Oct. 2, 2013, 1 page.

Non-Final Office for U.S. Appl. No. 14/078,605 dated Mar. 1, 2016; pp. 21.

Notice of Allowance and Fee(s) Due for U.S. Appl. No. 14/078,605 dated Sep. 12, 2016; pp. 15.

\* cited by examiner

GEOSPATIAL BASED MANAGEMENT OF CONFIGURATION PROFILES

CROSS-REFERENCE TO RELATED APPLICATIONS

This application is a continuation of co-pending U.S. patent application Ser. No. 14/078,605 filed on Nov. 13, 2013, which is hereby incorporated herein in its entirety for all that it contains.

BACKGROUND

Field of the Invention

The present invention relates to configuring network elements, and more particularly to a system, method and program product for automatically configuring network elements based on geospatial mapping coordinates.

Description of the Related Art

Configuration of network elements (e.g., servers, routers, workstations, peripherals, and other devices) continues to impose significant overhead when manufacturing, testing, shipping and installing such elements. In particular, a technician or other user is typically required to, e.g., edit a profile, load a driver, etc., whenever a device requires configuration or reconfiguration.

In many instances, the device will undergo various reconfigurations during its lifecycle. For example, a device may require a first configuration after it is manufactured and delivered to a testing facility, a second configuration when it is purchased and received at a reseller's warehouse, a third configuration when it is received at a client's location for installation, and a fourth configuration when it is retired or put up for resale. As noted, each reconfiguration requires a certain amount of time and cost, thus adding to the overall expense of the network element.

SUMMARY

Disclosed is a system, method and program product for automatically configuring network elements based on geospatial mapping coordinates. According to one aspect of the present invention, a computer system is disclosed having a configuration management system for managing configuration profiles for a set of devices within a network, comprising: a boundary definition system that employs a computerized process for defining a plurality of geospatial boundaries; a device manager that employs a computerized process for interfacing with remote agents associated with respective devices to recognize when a device has migrated into a new geospatial boundary; and a profile management system that employs a computerized process for uploading an updated configuration profile to the remote agent in response to the device being migrated to the new geospatial boundary.

In a second aspect, a program product stored on a computer readable storage medium is disclosed, which when executed by a computer system, manages profiles for a set of devices within a network and comprises: program code for defining a plurality of geospatial boundaries; program code for interfacing with remote agents associated with respective devices to recognize when a device has migrated into a new geospatial boundary; and program code for uploading an updated configuration profile to the remote agent in response to the device being migrated to the new geospatial boundary.

In a third aspect, a computerized method for managing profiles for a set of devices within a network is disclosed, comprising: defining a plurality of geospatial boundaries; interfacing with remote agents associated with respective devices to recognize when a device has migrated into a new geospatial boundary; and uploading an updated configuration profile to the remote agent in response to the device being migrated to the new geospatial boundary.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings.

Figure 1:
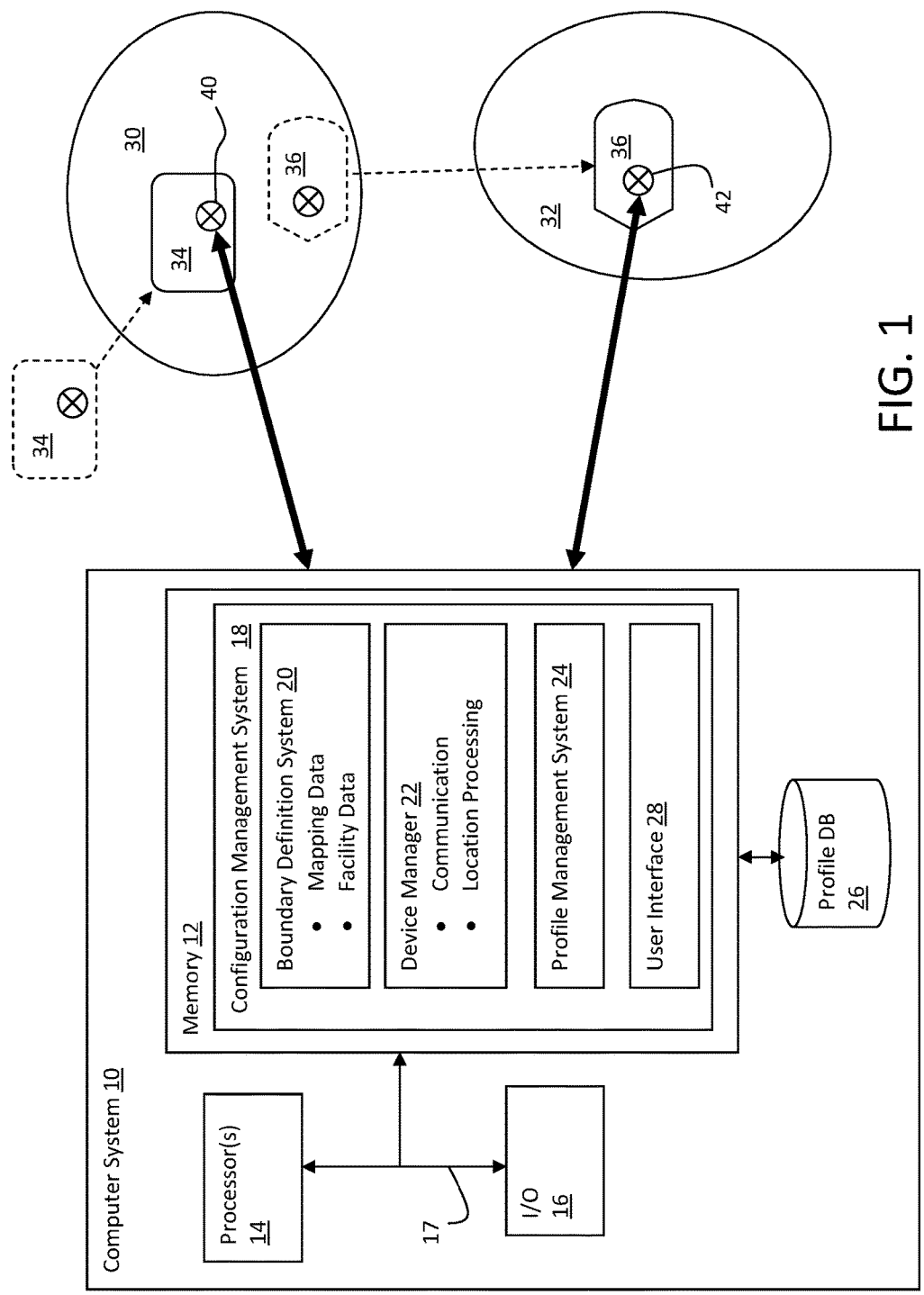
FIG. 1 depicts a computer system having a configuration management system in accordance with embodiments of the present invention.

The drawings are merely schematic representations, not intended to portray specific parameters of the invention. The drawings are intended to depict only typical embodiments of the invention, and therefore should not be considered as limiting the scope of the invention. In the drawings, like reference numbering represents like elements.

DETAILED DESCRIPTION

Described herein is an infrastructure that provides automated geospatial based configuration profile updates for network-based devices (or "devices"). A configuration profile (or "profile") generally comprises any set of parameters used to configure initial settings for a device. The profile can be used for any set-up function, e.g., the profile may be used to dictate permissions, set up protocols, determine file locations and/or IP addresses, launch start-up scripts, etc. Further, it is understood that a network-based device may comprise any device capable of communicating with other devices over a network, e.g., a router, a server, a work station, a printer, data storage, etc. As noted, it is not unusual for the configuration profile of a device to be reconfigured based on its location. For instance, a router may require a first profile when is arrives at a warehouse, a second profile when it arrives at a retail store, and a third profile when it arrives at a customer location.

FIG. 1 depicts an illustrative infrastructure having a computer system 10 that provides a configuration management system 18 that interfaces with remote agents 40, 42 associated with devices 34, 36, respectively. Configuration management system 18 generally includes: (1) a boundary definition system 20 for defining one or more geo-spatial boundaries 30, 32 ("boundaries"); (2) a device manager 22 that interfaces with and processes location information associated with the remote agents 40, 42 associated with devices 34, 36; and (3) a profile management system 24 that can retrieve and upload configuration profiles to devices 34, 36 based on their geospatial location.

In the example shown, two geospatial boundaries 30, 32 are shown. Geospatial boundaries 30, 32 may comprise any defined location or area including multidimensional map or coordinate data, and boundary definition system 20 may define a boundary using any computerized process. For instance, boundary definition system 20 may provide a facility for importing and/or processing digital map data (e.g., Google Maps™) within which an administrator can define geo-spatial areas or boundaries. For example, one boundary might comprises a city block in which a factory is housed, and another boundary might comprise a zip code where a group of distribution warehouses reside. In another embodiment, boundary definition system 20 may define boundaries within a facility, such as three-dimensional spatial data of a building, in which individual floors, rooms or portions of a building are defined as geospatial boundaries.

Device manager 22 provides an infrastructure for communicating with the remote agents 40, 42 to ascertain when an agent and associated device relocates or migrates to a new geospatial boundary. For instance, when device 34 is placed into boundary 30 and is powered up, device manager 22 can be notified by its remote agent 40 via the Internet of the device's current geospatial coordinates. Device manager 22 can process the location information to determine the geospatial boundary 30 in which device 34 now resides. Similarly, when device 36 is migrated from boundary 30 to boundary 32, device manager 22 can likewise recognize the new boundary. Device manager 22 may for example utilize Simple Network Management Protocol (SNMP) to interface with client devices.

Any process can be used to determine when a device 34, 36 has entered a new geospatial boundary 30, 32. In one embodiment, global positioning system (GPS) location data collected by a remote agent 40, 42 can be fed to device manager 22 whenever the associated device 34, 36 is powered up. Device manager 22 can then check to see if the device 34, 36 changed locations since a last power up. In an alternative embodiment, the remote agent 40, 42 can push location data back to the device manager 22 either in a periodic fashion, e.g., every hour, or based on some triggering event. In yet another embodiment, the remote agent can periodically compare its current location with a previously determined location to ascertain whether the device has been relocated. If relocation occurred, a notification can be sent to the device manager 22.

Regardless, once relocation to a new geospatial boundary is detected, profile management system 24 can be employed to retrieve an updated profile for the device at its current location from the profile database 26. To achieve this, profile database 26 may store profiles for sets of device/location pairings. Thus, for a given device (or device type or device class), a set of profiles will be stored, in which each profile corresponds with a different geospatial boundary for the device. A user interface 28 may be employed to allow a user or administrator to create and/or store profiles.

Once retrieved by profile management system 24, the updated profile can be uploaded to the remote agent 40, 42 associated with the device 34, 36, and installed by the remote agent 40, 42.

Figure 2:
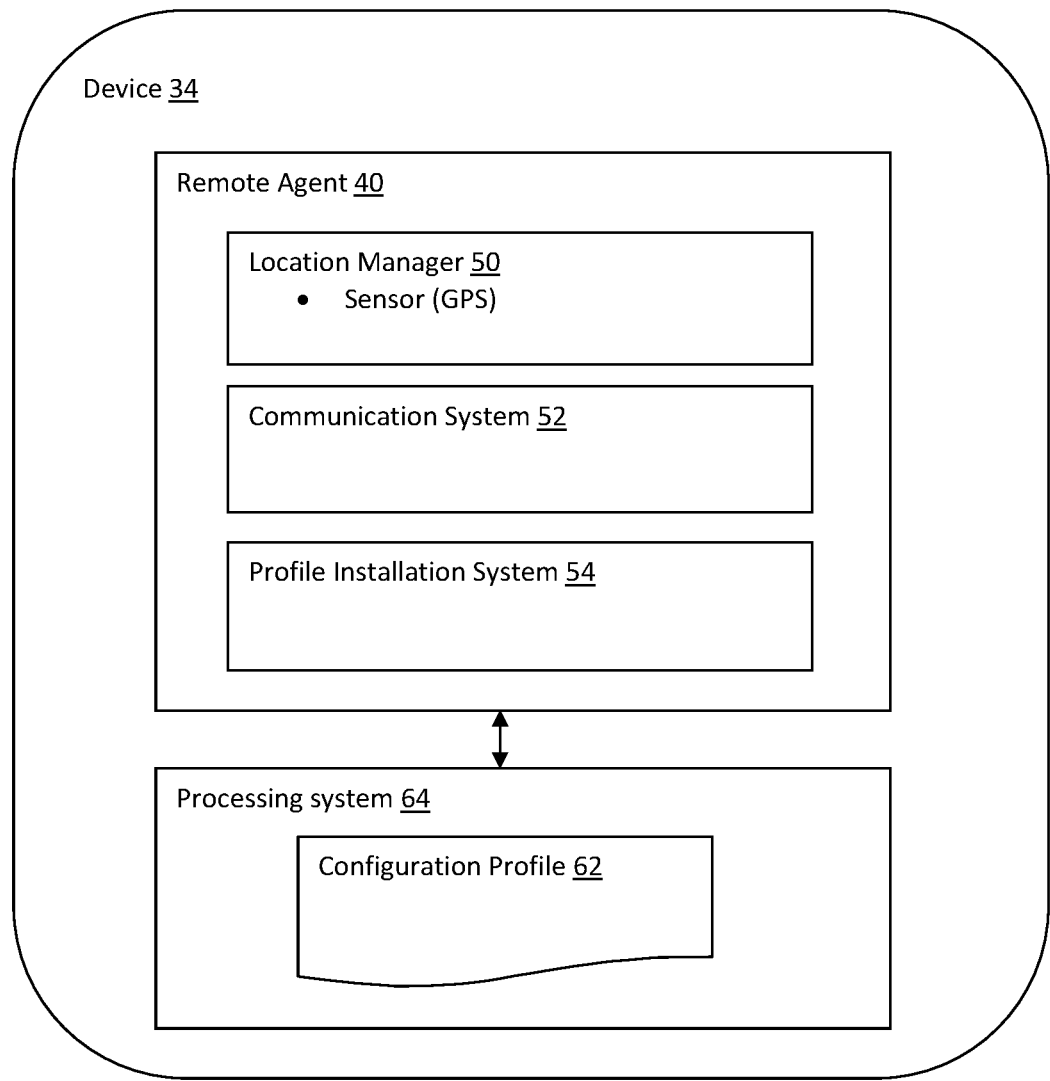
FIG. 2 depicts a remote agent in accordance with embodiments of the present invention.

FIG. 2 depicts device 34 and associated remote agent 40 in more detail. Device 34 may for example include in internal processing system 64 such as an ASIC (application specific integrated circuit) device or embedded processor for controlling operations. Device 34 utilizes a configuration profile 62, which can be run or accessed by the processing system 64 to initially configure the device 34. Configuration profile 62 may for example include an ASCII file residing in any type of device storage, such as firmware, ROM, etc.

As noted, remote agent 40 is utilized to automatically update the configuration profile 62 whenever device 34 is migrated to a new geospatial boundary. Remote agent 40 may for example be implemented as software using any type of coding, e.g., DARPA Agent Markup Language, which can be executed within processing system 64 or some other associated execution environment.

As shown, remote agent 40 includes a location manager 50 that utilizes a location sensor (e.g., GPS device, triangulation, RFID sensors, etc.) for determining a geospatial location of remote agent 40. Depending on the embodiment, location manager 50 may ascertain location information in any manner, e.g., whenever the network device 34 is powered on, periodically, based on a request from the configuration management system 18 (FIG. 1), based on a triggering event, etc. In any case, location manager 50 is configured to send location information back to configuration management system 18 and if appropriate, receive an updated configuration profile 62 via communication system 52. Communication system 52 is provided to establish a communication channel between the remote agent 40 and the configuration management system 18, using, e.g., an Internet Protocol (IP) address. In the event device 34 is relocated to a new geospatial boundary, an updated configuration profile 62 is uploaded and installed using profile installation system 54. Installation of the updated profile may for example be achieved with a script run by the remote agent.

In a further embodiment, rather than a single configuration profile 62, a master profile 64 may be utilized, which comprises a more complex or dynamic structure that allows for a set of "sub-profiles." Thus, for example, the master profile 64 may apply to an entire building, and sub-profiles would apply to more granular spaces within the building. Accordingly, if device 34 were moved from office A to office B, location manager 50 could recognize the location change and install a sub-profile associated with office B, without having to re-download a new configuration profile from the configuration management system 18 (FIG. 1). Instead, sub-profiles stored in the master profile 64 could be dynamically activated when a change of location occurs within a multidimensional space.

In one illustrative embodiment, master profile 64 may employ a multidimensional coordinate system that implements a hierarchy structure for storing and managing sub-profiles. In this case, the master profile 64 may specify sub-profiles at different hierarchical levels based on a set of spatial (and possibly non-spatial) coordinates. For instance, master profile 64 may establish a "parent" profile level, e.g., X(x1, x6), Y(y1, y6) that specifies a rectangular boundary defining a two dimensional space, such the footprint of a building. A first "child" sub-profile may for example be established for a two-dimensional subsection, such as a wing of the building, e.g., X(x1, x4), Y(y1, y4). A second "child" sub-profile may be established for a three dimensional rectangular region of the building, such as the first two floors of the building, e.g., X(x1, x6), Y(y1, y6), Z(z0, z2). A third "grandchild" sub-profile may be established for a server room on the second floor of the building, e.g., X(x2, x4), Y(y2, y4), Z(z1, z2). A fourth "great-grandchild" sub-profile may be established for a specified region within the server room, e.g., X(x2, x3), Y(y2, y3), Z(z1, z2). Thus, as the device is moved around within the building, a hierarchy of sub-profiles could be employed. It is understood that other more complex multidimensional shapes and hierarchies could be implemented, e.g., circular or spherical spaces, triangular or conical regions, trapezoidal spaces, etc., and the geospatial areas are not limited to building and facilities. Further, although generally described with reference to spatial dimensions, non-spatial dimensions such as time or other attributes could be utilized as well.

Figure 3:
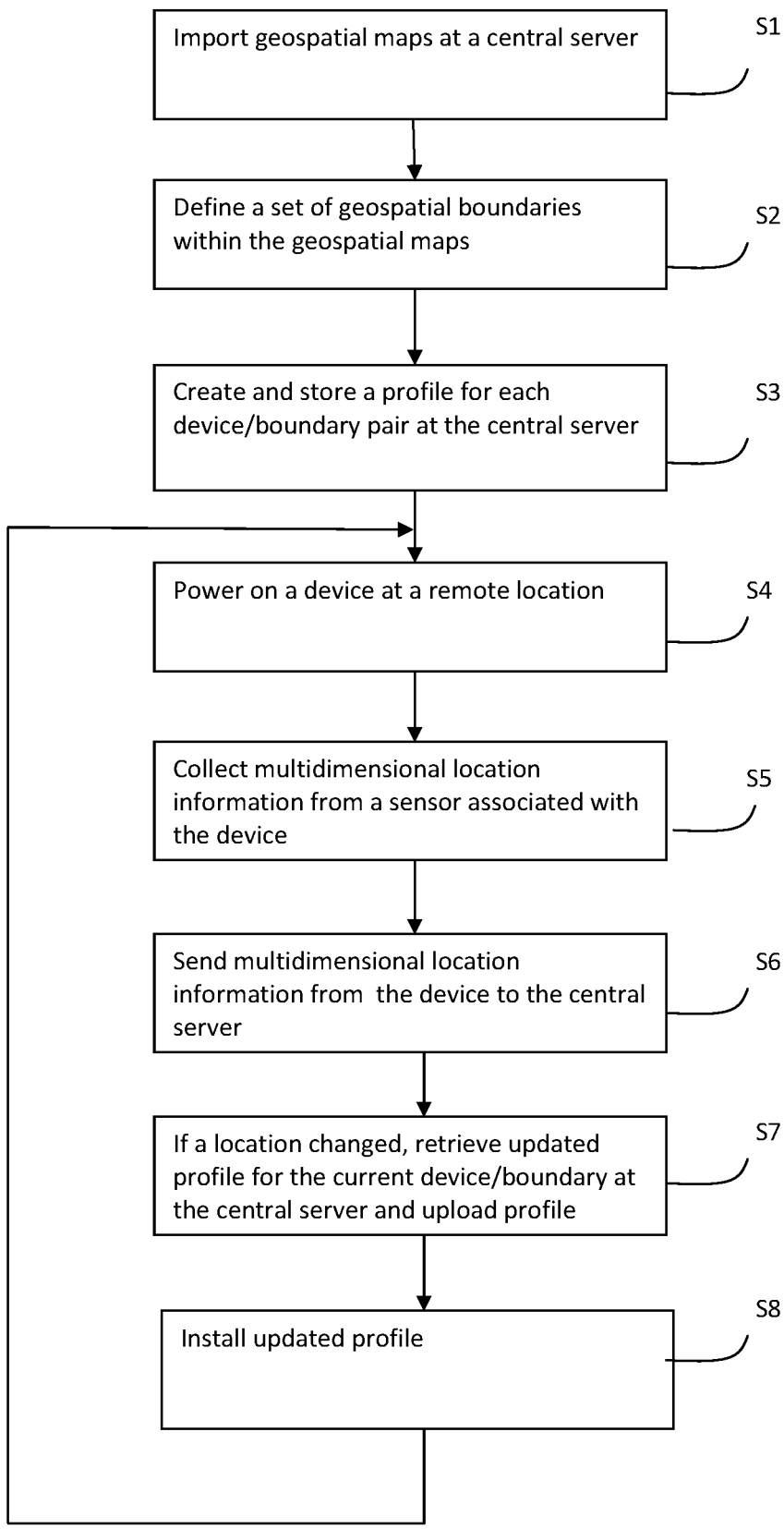
FIG. 3 depicts a flow diagram showing a method for updating configuration profiles for remote network devices in accordance with embodiments of the present invention.

FIG. 3 depicts a flow diagram showing a method of implementing a profile update process. At S1, geospatial map data is imported at a central server (e.g., computer system 10 of FIG. 1). At S2, a set of geospatial boundaries are defined within the geospatial map data. At S3, profiles are created for device/boundary pairs at the central server.

Next, whenever an associated device is powered on at a remote location (S4), geospatial location information is collected from the device (S5) and is sent back to the central server (S6). At S7, in the event that a location change occurred, an updated profile is retrieved and uploaded to the device for use at its new geospatial boundary. At S8, the updated profile is installed on the device. S4-S8 are then repeated any time a device is powered.

As will be appreciated by one skilled in the art, aspects of the present invention may be embodied as a system, method or computer program product. Accordingly, aspects of the present invention may be employed with a computerized process that takes the form of an entirely hardware embodiment, an entirely software embodiment (including firmware, resident software, micro-code, etc.) or an embodiment combining software and hardware aspects that may all generally be referred to herein as a "system." Furthermore, aspects of the present invention may take the form of a computer program product embodied in one or more computer readable medium(s) having computer readable program code embodied thereon.

Any combination of one or more computer readable medium(s) may be utilized. The computer readable medium comprises a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Alternatively, the program product could be embodied on computer readable signal medium which may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer system 10 of FIG. 1 may comprise any type of computing device and is shown including a one or more processors 14, memory 12, an input/output (110) 16 (e.g., one or more I/O interfaces and/or devices), and a communications pathway 17. In general, processor(s) 14 execute program code, such as configuration management system 18, which is at least partially fixed in memory 12. While executing program code, processor(s) 14 can process data, which can result in reading and/or writing transformed data from/to memory 12 and/or I/O 16 for further processing. Pathway 17 provides a communications link between each of the components in computer system 10. I/O 16 can comprise one or more human I/O devices, which enable a user to interact with computer system 10. To this extent, configuration management system 18 can manage a set of interfaces (e.g., graphical user interface(s), application program interface, and/or the like) that enable human and/or system users to interact with the configuration management system 18. Further, configuration management system 18 can manage (e.g., store, retrieve, create, manipulate, organize, present, etc.) data, such as data in profile database 26, using any solution.

In any event, computer system 10 can comprise one or more general purpose computing articles of manufacture (e.g., computing devices) capable of executing program code. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, configuration management system 18 can be embodied as any combination of system software and/or application software.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer system having a configuration management system for dynamically managing configuration profiles for a set of devices within a network, comprising:
    a boundary definition system that employs a computerized process for defining a plurality of geospatial boundaries;
    a device manager that employs a computerized process for interfacing with remote agents associated with respective devices to recognize when a device has migrated into a new geospatial boundary of the plurality of geospatial boundaries; and
    a profile management system that employs a computerized process for uploading an updated configuration profile to the remote agent in response to the device being migrated to the new geospatial boundary, the updated configuration profile including:
        a set of sub-profiles, each sub-profile of the set of sub-profiles associated with a corresponding geospatial boundary of the plurality of geospatial boundaries,
    wherein in response to recognizing the device is migrated to the new geospatial boundary, a corresponding sub-profile of the set of sub-profiles associated with the new geospatial boundary is uploaded to the remote agent.

2. The computer system of claim 1, wherein each sub-profile is associated with a set of multidimensional spatial coordinates within the new geospatial boundary.

3. The computer system of claim 2, wherein the set of multidimensional spatial coordinates are stored and managed in a hierarchical configuration.

4. The computer system of claim 1, wherein the new geospatial boundary is selected from a group consisting of: a geographic area on a map, a three dimensional space, an area within a facility, a floor within a building, and a room on a floor.

5. The computer system of claim 1, wherein the device manager receives a notification with location coordinates from a remote agent in response to a device being powered on.

6. The computer system of claim 1, wherein the device manager receives a notification with location coordinates from a remote agent in response to the remote agent detecting that a change of location of a device has occurred.

7. The computer system of claim 1, wherein the device manager receives periodic location coordinates from each remote agent and determines whether a change of location has occurred.

8. A program product stored on a non-transitory computer readable storage medium, which when executed by a computer system, manages profiles for a set of devices within a network and comprises:
    program code for defining a plurality of geospatial boundaries;
    program code for interfacing with remote agents associated with respective devices to recognize when a device has migrated into a new geospatial boundary; and
    program code for uploading an updated configuration profile to the remote agent in response to the device being migrated to the new geospatial boundary, the updated configuration profile including:
        a set of sub-profiles, each sub-profile of the set of sub-profiles associated with a corresponding geospatial boundary of the plurality of geospatial boundaries,
    wherein in response to recognizing the device is migrated to the new geospatial boundary, a corresponding sub-profile of the set of sub-profiles associated with the new geospatial boundary is uploaded to the remote agent.

9. The program product of claim 8, wherein each sub-profile is associated with a set of multidimensional spatial coordinates within the new geospatial boundary.

10. The program product of claim 9, wherein the set of multidimensional spatial coordinates are stored and managed in a hierarchical configuration.

11. The program product of claim 8, wherein the new geospatial boundary is selected from a group consisting of: a geographic area on a map, and a three dimensional space, an area within a facility, a floor within a building, and a room on a floor.

12. The program product of claim 8, wherein a notification is received with location coordinates from a remote agent in response to a device being powered on.

13. The program product of claim 8, wherein a notification is received with location coordinates from a remote agent in response to the remote agent detecting that a change of location of a device has occurred.

14. The program product of claim 8, wherein a notification is received with periodic location coordinates from each remote agent to determine whether a change of location has occurred.

15. A computerized method for managing profiles for a set of devices within a network, comprising:
   defining a plurality of geospatial boundaries;
   interfacing with remote agents associated with respective devices to recognize when a device has migrated into a new geospatial boundary; and
   uploading an updated configuration profile to the remote agent in response to the device being migrated to the new geospatial boundary, the updated configuration profile including:
      a set of sub-profiles, each sub-profile of the set of sub-profiles associated with a corresponding geospatial boundary of the plurality of geospatial boundaries,
   wherein in response to recognizing the device is migrated to the new geospatial boundary, a corresponding sub-profile of the set of sub-profiles associated with the new geospatial boundary is uploaded to the remote agent.

16. The method of claim 15, wherein each sub-profile is associated with a set of multidimensional spatial coordinates within the new geospatial boundary.

17. The method of claim 16, wherein the set of multidimensional spatial coordinates are stored and managed in a hierarchical configuration.

18. The method of claim 15, wherein the new geospatial boundary is selected from a group consisting of: a geographic area on a map, and a three dimensional space, an area within a facility, a floor within a building, and a room on a floor.

19. The method of claim 15, wherein a notification is received with location coordinates from a remote agent in response to a device being powered on.

20. The method of claim 15, wherein a notification is received with location coordinates from a remote agent in response to the remote agent detecting that a change of location of a device has occurred.

\* \* \* \* \*